L. M. SARTAIN.
NUT LOCK.
APPLICATION FILED AUG. 28, 1916.
1,217,835.
Patented Feb. 27, 1917.
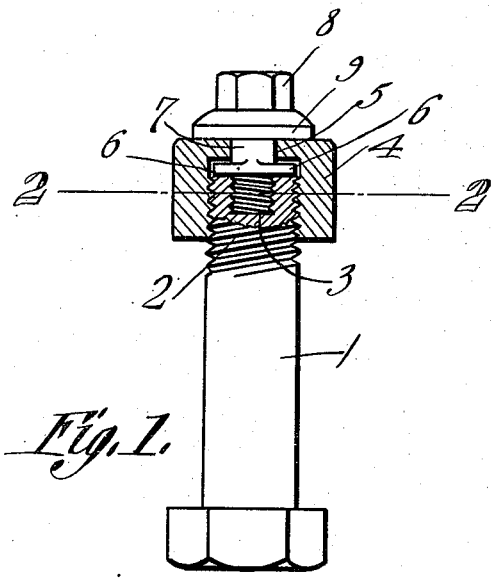
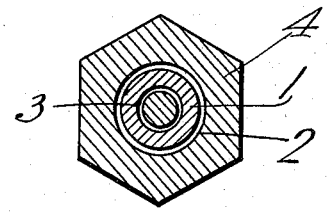
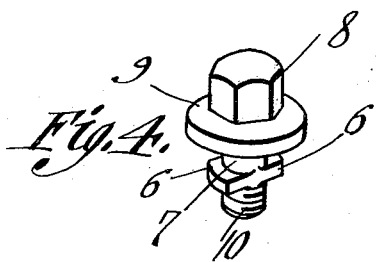
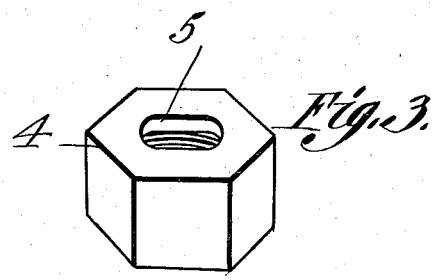
Witnesses
L. M. Sartain
Inventor
by C. A. Snow & Co.
Attorneys

UNITED STATES PATENT OFFICE.

LOUIS MARTAIN SARTAIN, OF ALTAMONT, TENNESSEE, ASSIGNOR OF ONE-TENTH TO GEO. D. BOYD, ONE-TENTH TO E. C. SHELTON, ONE-TENTH TO S. D. SCOTT, ONE-TENTH TO W. E. GILLEN, ONE-TENTH TO JAMES DICKERSON, ONE-TENTH TO JOHN WOODLEE, JR., ONE-TENTH TO E. HENSON, AND ONE-TENTH TO D. C. LASATER, ALL OF ALTAMONT, TENNESSEE.

NUT-LOCK.

1,217,835.

Specification of Letters Patent. Patented Feb. 27, 1917.

Application filed August 28, 1916. Serial No. 117,280.

*To all whom it may concern:*

Be it known that I, LOUIS MARTAIN SARTAIN, a citizen of the United States, residing at Altamont, in the county of Grundy and State of Tennessee, have invented a new and useful Nut-Lock, of which the following is a specification.

This invention relates to nut locks, one of its objects being to provide a nut with a novel form of lock which, when in engagement with the nut and bolt will hold said nut positively against removal accidentally.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in section and partly in elevation of a nut lock embodying the present improvements.

Fig. 2 is a section on line 2—2 Fig. 1.

Fig. 3 is a perspective view of the nut used in connection with the bolt.

Fig. 4 is a perspective view of the lock nut employed.

Referring to the figures by characters of reference 1 designates a bolt provided with the usual threads 2 and formed in the end of the bolt is a bore 3 having threads pitched oppositely to the threads 2. The nut 4 used in connection with bolt 1 has an elongated substantially elliptical opening 5 in its outer end and this opening is designed to receive oppositely extending retaining ears 6 projecting from the stem 7 of a locking member in the form of a head 8 at the inner end of which is provided an annular flange 9. The free end portion of the stem 7 is threaded and adapted to engage threads in the bore 3.

In using the structure herein described the stem 7 is inserted through the elongated opening 5 and the wings or ears 6 are likewise inserted through said opening. Nut 4 is then placed on the bolt 1 and the threaded end 10 of the stem 7 placed at the outer end of the bore 3. Nut 4 and head 8 are simultaneously rotated in opposite directions and will, consequently, both screw into engagement with the bolt simultaneously, the ears 6 ultimately coming against the end of the bolt while the nut 4 will ultimately bind upon the ears. With the parts thus positioned it will be obvious that unscrewing of the nut 4 will be prevented by the flange 9 which laps the outer end of the nut and unscrewing of the stem 7 will be prevented by the ears 6 engaging the inner surface of the nut. Thus the parts are securely held against accidental unscrewing and the only way in which they can be removed is to simultaneously unscrew them in opposite directions respectively.

What is claimed is:—

In a nut lock the combination with a bolt exteriorly screw threaded and having a bore in one end with threads pitched oppositely to the exterior threads, of a nut for engaging the exterior threads, said nut having an elongated opening in its outer end, a stem having oppositely extending ears insertible through the opening and revoluble within the nut, said stem having a threaded portion projecting beyond the ears and adapted to screw into the bore, there being a flanged head at the outer end of the stem for lapping and engaging the nut, said stem and nut being revoluble simultaneously in opposite directions respectively to screw into or unscrew from engagement with the bolt.

In testimony that I claim the foregoing as my own, I have hereto affixed my signature in the presence of two witnesses.

LOUIS MARTAIN SARTAIN.

Witnesses:
 FRED SCHWOON, Jr.,
 GEO. D. BOYD.

Copies of this patent may be obtained for five cents each, by addressing the "Commissioner of Patents, Washington, D. C."